US009055425B2

(12) United States Patent
Luukkala et al.

(10) Patent No.: US 9,055,425 B2
(45) Date of Patent: Jun. 9, 2015

(54) METHOD AND APPARATUS FOR ENHANCING EMERGENCY CALLING WITH MOBILE DEVICES

(71) Applicants: Vesa-Veikko Luukkala, Espoo (FI); Jari-Jukka Harald Kaaja, Järvenpää (FI); Mikko Aleksi Uusitalo, Helsinki (FI)

(72) Inventors: Vesa-Veikko Luukkala, Espoo (FI); Jari-Jukka Harald Kaaja, Järvenpää (FI); Mikko Aleksi Uusitalo, Helsinki (FI)

(73) Assignee: NOKIA TECHNOLOGIES OY, ESPOO (FI)

( * ) Notice: Subject to any disclaimer, the term of this patent is extended or adjusted under 35 U.S.C. 154(b) by 33 days.

(21) Appl. No.: 13/628,141

(22) Filed: Sep. 27, 2012

(65) Prior Publication Data

US 2014/0087680 A1 Mar. 27, 2014

(51) Int. Cl.
H04M 11/04 (2006.01)
H04W 4/22 (2009.01)

(52) U.S. Cl.
CPC ...................... H04W 4/22 (2013.01)

(58) Field of Classification Search
CPC ...... H04W 76/007; H04W 4/22; H04M 11/04
USPC ............. 455/404.1, 414.1, 418, 423
See application file for complete search history.

(56) References Cited

U.S. PATENT DOCUMENTS

| 7,974,613 | B1* | 7/2011 | Shanker et al. | 455/419 |
| 2006/0120301 | A1* | 6/2006 | Falck et al. | 370/254 |
| 2006/0177049 | A1* | 8/2006 | Ukon | 379/441 |
| 2010/0317314 | A1 | 12/2010 | Roland | |

FOREIGN PATENT DOCUMENTS

| DE | 10 2005 021 115 A1 | 11/2006 |
| EP | 1 575 323 A1 | 9/2005 |
| EP | 2 080 674 A1 | 7/2009 |
| FR | 2 891 687 A1 | 4/2007 |
| WO | 2005/064904 A1 | 7/2005 |
| WO | 2007/075646 A2 | 7/2007 |

OTHER PUBLICATIONS

"Ecall: Time Saved=Lives Saved," pp. 1-3, < http://ec.europa.eu/information_society/activities/esafety/ecall/index_en.htm >.
Vehicle Functionality Working Group (ECIV) (Chair Dr. W. Reinhardt, ACEA), "European e-Call Functional Specifications in Vehicle System," Version 1.1, Working Document, pp. 1-14, < http://www.esafetysupport.org/download/ecall_toolbox/Reports/Appendix_10.pdf >.

* cited by examiner

Primary Examiner — Nghi H Ly
(74) Attorney, Agent, or Firm — Ditthavong & Steiner, P.C.

(57) ABSTRACT

An approach is provided for leveraging mobile devices to enhance emergency calling. The connectivity processor determines a request to initiate at least one call from at least one device. Next, the connectivity processor determines one or more devices with connectivity to the at least one device. Then, the connectivity processor determines at least one main devices from among the at least one device and the one or more other devices to initiate the at least one call based, at least in part, on operational status information, device capability information, resource availability information, or a combination thereof.

20 Claims, 14 Drawing Sheets

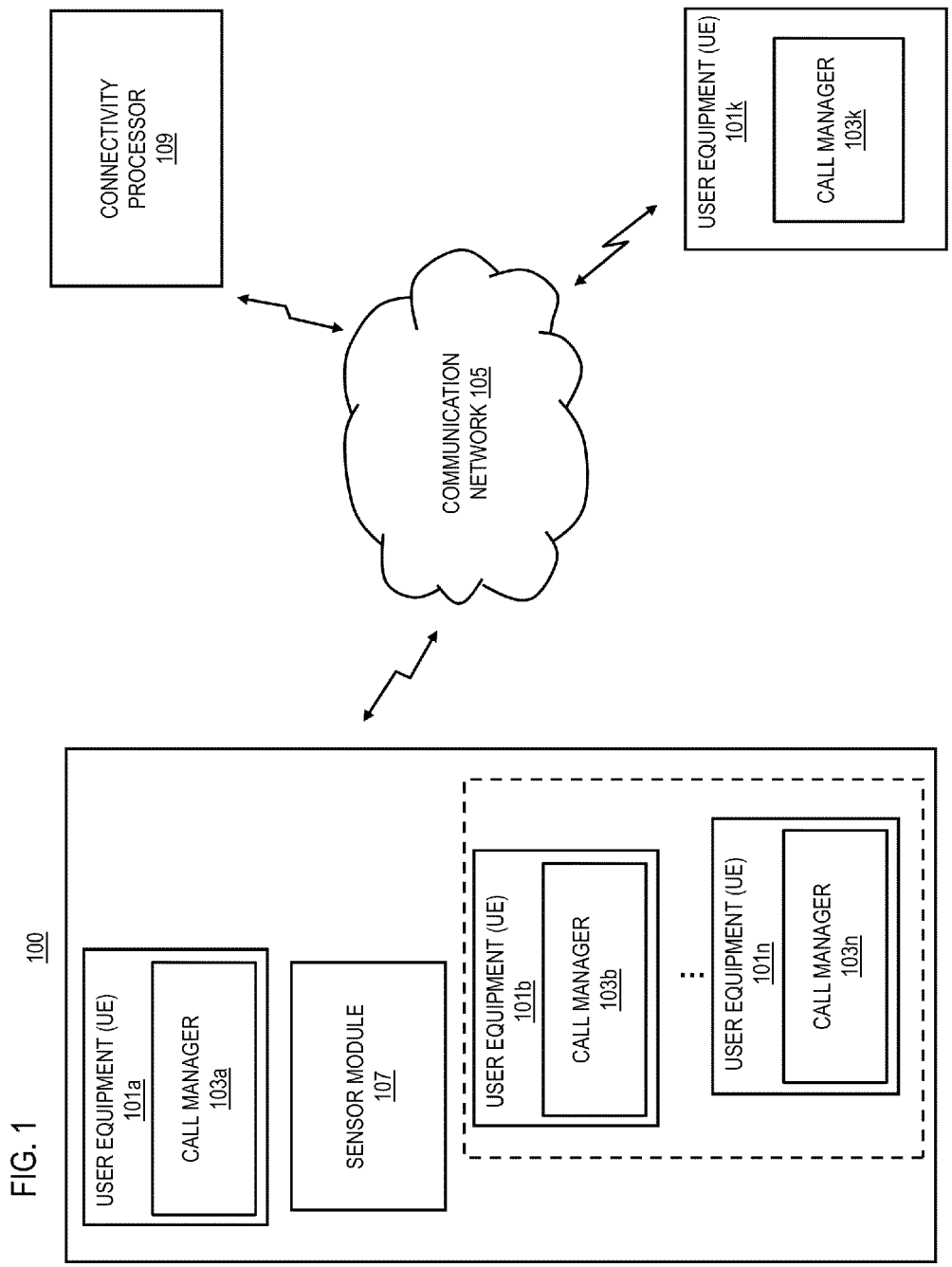

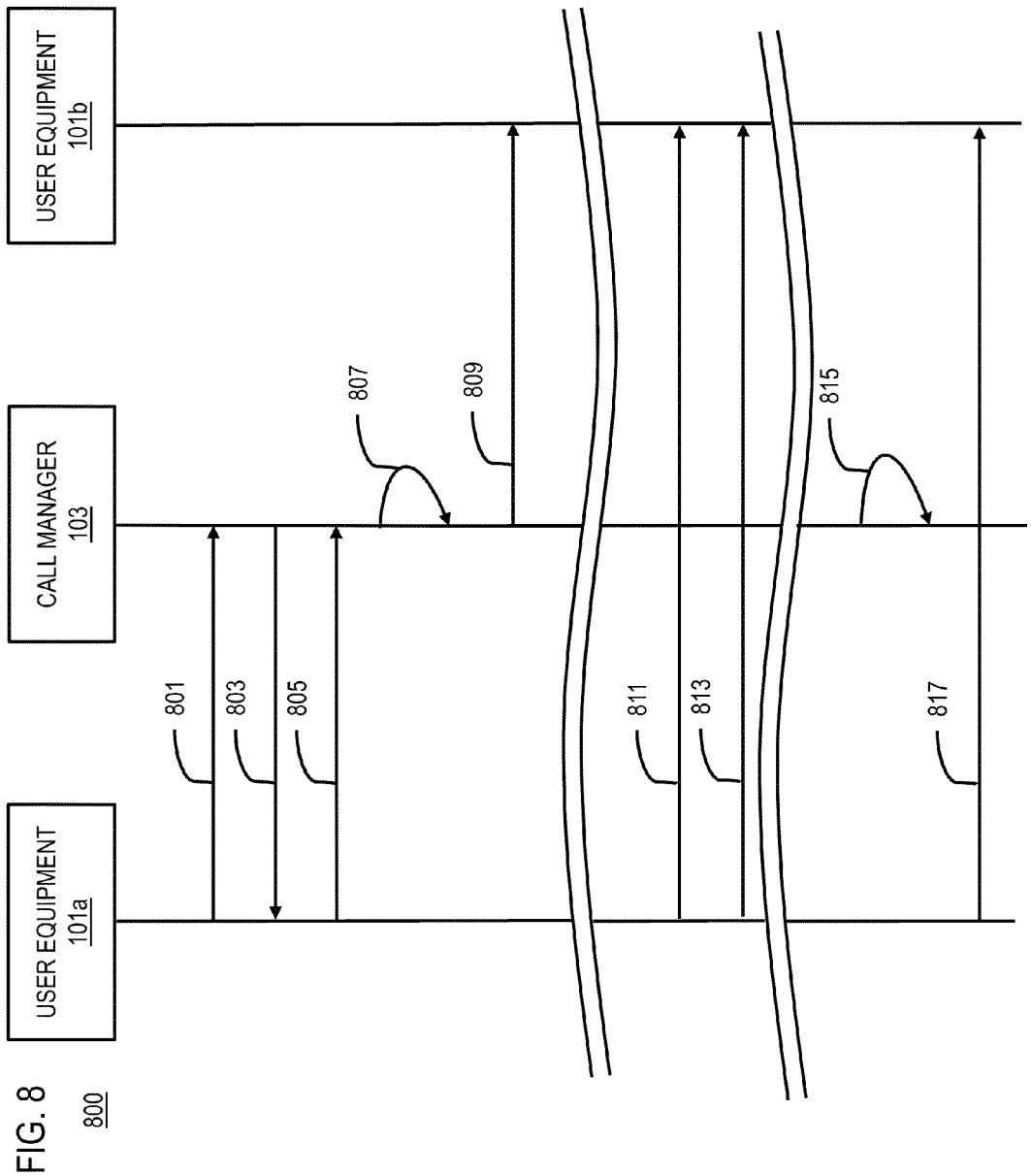

METHOD AND APPARATUS FOR ENHANCING EMERGENCY CALLING WITH MOBILE DEVICES

BACKGROUND

Service providers and device manufacturers (e.g., wireless, cellular, etc.) are continually challenged to deliver value and convenience to consumers by, for example, providing compelling network services. One area of interest has been the development of automatic calls in response to emergencies (referred to herein as e-calls). These development efforts have been spurred by governmental and other standards bodies that have been investigating and promoting common standards for e-calls. One example of an e-call mechanism is the European Union's eCall initiative to implement automatic emergency call mechanisms in cars, with the aim of the mechanism becoming a global standard. As a result, service providers and device manufacturers face significant challenges to developing mechanisms that are highly available and reliable in emergency situations (e.g., automobile accidents, health emergencies, and the like), while also leveraging the use of existing or commonly available communication devices (e.g., mobile devices such as cell phones).

SOME EXAMPLE EMBODIMENTS

Therefore, there is a need for an approach for leveraging mobile devices to enhance and make e-calling more efficient and available to end users.

According to one embodiment, a method comprises determining a request to initiate at least one call from at least one device. The method also comprises determining one or more other devices with connectivity to the at least one device. The method further comprises determining at least one main device from among the at least one device and the one or more other devices to initiate the at least one call based, at least in part, on operational status information, device capability information, resource availability information, or a combination thereof.

According to another embodiment, an apparatus comprises at least one processor, and at least one memory including computer program code for one or more computer programs, the at least one memory and the computer program code configured to, with the at least one processor, cause, at least in part, the apparatus to determine a request to initiate at least one call from at least one device. The apparatus is also caused to determine one or more other devices with connectivity to the at least one device. The apparatus is further caused to determine at least one main device from among the at least one device and the one or more other devices to initiate the at least one call based, at least in part, on operational status information, device capability information, resource availability information, or a combination thereof.

According to another embodiment, a computer-readable storage medium carries one or more sequences of one or more instructions which, when executed by one or more processors, cause, at least in part, an apparatus to determine a request to initiate at least one call from at least one device. The apparatus is also caused to determine one or more other devices with connectivity to the at least one device. The apparatus is further caused to determine at least one main device from among the at least one device and the one or more other devices to initiate the at least one call based, at least in part, on operational status information, device capability information, resource availability information, or a combination thereof.

According to another embodiment, an apparatus comprises means for determining a request to initiate at least one call from at least one device. The apparatus also comprises means for determining one or more other devices with connectivity to the at least one device. The apparatus further comprises means for determining at least one main device from among the at least one device and the one or more other devices to initiate the at least one call based, at least in part, on operational status information, device capability information, resource availability information, or a combination thereof.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention.

Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of leveraging mobile devices to enhance and make emergency calling more efficient and available to end users, according to one embodiment;

FIG. 8 is a ladder diagram that illustrates a sequence of processes used in leveraging mobile devices to place an emergency call, according to one embodiment;

DESCRIPTION OF SOME EMBODIMENTS

Figure 2A:
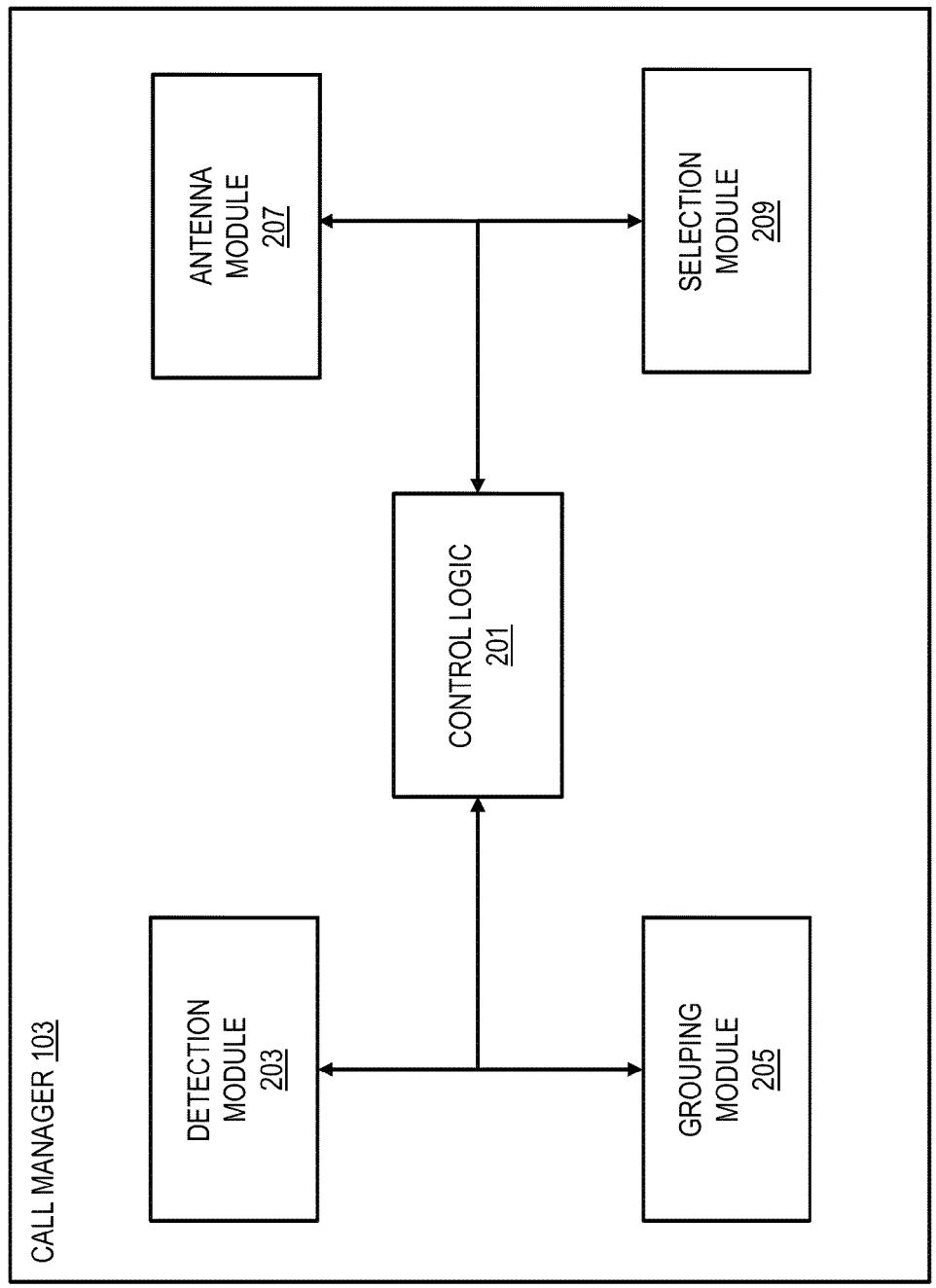
FIG. 2A is a diagram of the components of the call manager, according to one embodiment.

Examples of a method, apparatus, and computer program for leveraging mobile devices to enhance and make emergency calling (e-calling) more efficient and available to end users are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of leveraging mobile devices to enhance and make emergency calling more efficient and available to end users, according to one embodiment. As noted above, governmental agencies and standards bodies have are increasingly recognition the importance of emergency calling or e-calling for ensuring public safety. For example, eCall is a European initiative to implement automatic e-call mechanisms in cars. It is noted that although various embodiments are described with respect to the European eCall initiative, it is contemplated that the various embodiments are applicable to any other e-calling standard as well as to the initiating of automatic calls using multiple devices in the absence of an emergency.

In one implementation of eCall, an eCall device integrated with a car (e.g. GM OnStar) may automatically initiate an emergency call upon sensing a vehicle emergency or accident. eCalls and other e-calling efforts are projected to reduce vehicular accident response time by about 50% in rural areas and 40% in urban areas. In doing so, eCall functionality is expected to save lives and reduce the severity of injuries. By way of example, the eCall initiative aims to have e-calling available as a standard such that all vehicles will automatically place an emergency call, alerting nearby emergency agencies to the emergency location (e.g., Global Positioning System (GPS) coordinates), establishing voice communication in the event of a sensor-detected emergency, and the like. Detecting an accident may include sensors detecting emergency situations, including airbag deployment, acceleration sensors, etc. In one embodiment, vehicles are equipped with telematics technology including in-vehicle systems, wireless data delivery, and public safety answering point systems to facilitate emergency action. In placing the call, the eCall may notify the nearest emergency center and establish a voice connection, video connection, and/or deliver a "minimum data set" including the location of the emergency and information associated with the vehicle. In one embodiment, users may manually initiate eCalls by pushing a button. Alternately, the eCall mechanism may automatically place an eCall upon emergency detection.

However, one problem with eCall and other similar e-calling approaches is the use of dedicated hardware components that typically are fixed or equipped with a car. Consequently, it will generally be only those users who have the vehicles equipped with e-calling equipment built into their vehicles who can benefit from e-calling. For example, while the European eCall initiative aims to make e-calling mandatory in all new cars by 2015, there will remain, for at least a considerable period of time, a significant population of older vehicles that will not be so equipped. Moreover, emergency situations may arise when operating away from a vehicle. Accordingly, tying emergency calling capabilities to dedicated hardware or fixed mounted solutions can be problematic. Plus, relying on just one device for e-calling limits the range and connectivity of the e-calling to the range and connectivity available to the antenna of the one device. Using multiple devices and therefore, multiple antennas simultaneously, may enhance range and connectivity available for e-calling.

Additionally, fixed mounted solutions may be susceptible to damage during accidents. For example, the hardware (e.g., transmitters, antennas, etc.) can be rendered inoperable by physical damaged sustained by a vehicle during a crash. In some cases, even if the equipment remains operable, performance can be significantly decreased by damage. For example, an antenna or a portion of an antenna can be destroyed so that communication range, power consumption, etc. can significantly reduce the capabilities of the e-calling system. Moreover, the performance of an e-calling mechanism or system can be particularly important in light of the critical nature of the establishing and maintaining an emergency quickly and reliably after an emergency has occurred. In many emergency situations, initiating a call as quickly as possible after an emergency can ensure that emergency responders will be able to reach the emergency quickly.

To address this problem, a system 100 of FIG. 1 introduces the capability to enhance e-calling by leveraging the use of existing user devices (e.g., mobile devices) to expand e-calling beyond fixed or proprietary hardware. In one embodiment, the mobile devices can be grouped into a collection of calling nodes to make e-calling more available and/or reliable by: (1) priming the mobile devices to act as e-calling nodes so that the mobile devices can perform an e-call in case the fixed or proprietary system is unavailable to do so; (2) ensuring that system 100 selects the mobile device with the best resources to make the e-call—e.g., by relaying the e-call request from one device to another device with better resources; (3) establishing a common virtual multi-antenna system (e.g., a multiple input and multiple output (MIMO) antenna) to facilitate a better connection from and to the mobile devices in terms of capacity and range; and (4) augmenting the e-call with other relevant information available via the mobile devices such as the number of mobile devices visible to the system 100 in or near the car, health sensor information, mobile device capabilities, and the like.

In one embodiment, the system may determine a request to initiate at least one call from at least one device. In one embodiment, the at least one device may include a car such that system 100 may be associated with a car. By way of example, a telematics system associated with the car may identify an event that prompts system 100 to determine a request to initiate a call. For instance, a telematics system may include sensors that may detect an emergency situation, including airbag deployment, sudden engine failure, rapid acceleration and/or deceleration, etc. In another example, the sensors may be associated with one or more physiological signals, including drastic changes in heart rate. The sensors of the telematics system may be configured to send the system 100 a request to initiate a call when the sensors detect a certain range of activity. In one scenario, the system 100 may receive a request to initiate a call when sensors associated with a car telematics system detect airbag deployment following a car crash. In another scenario, accidents involving public transport, motorcycles, bicycles, etc. may prompt system 100 to initiate a call in response to sensors detecting rapid deceleration. In yet another scenario, sensors may detect heart failure and send system 100 a request to initiate a call.

In one embodiment, the telematics system may include GPS technology such that the system 100 may transmit a minimum set of data (MSD) along with a call to aid emergency response teams. The MSD may provide information to help emergency response personnel reach the scene of an emergency and prepare the most relevant medical care. As such, the MSD may include precise GPS coordinates, time of accident, vehicle identification, information about a possible service provider, or a combination thereof. In a further embodiment, the system 100 may provide a voice connection in addition to the MSD data link in order to supplement communication between the accident scene and the emergency response center.

In one embodiment, the system 100 may determine one or more other devices with connectivity to the at least one device to prime the devices to act as e-calling nodes. In one embodiment, the one or more devices may include mobile devices associated with passengers in a car (where the car is the at least one devices). For example, system 100 may detect mobile devices associated with passengers in a car. One such case may include docking stations that detect where one or more mobile devices are in proximity with the car. The detection may occur with placing the one or more mobile devices in proximity with the one or more docks. For example, a car may include one or more such docks where passengers may put their mobile devices. In another example, a detection system may include a prompt for passengers to touch their mobile devices to the one or more docks directly, or touch their mobile devices to the one or more docks for the system 100 to identify the mobile devices as joining the local network. In permitting the devices to be detected, the one or more docks and/or system 100 may prompt the devices to initiate cellular networks, including short-range Bluetooth, near field communications (NFC), and wireless local-area networks such that the at least one device and one or more devices are in connectivity with one another. In another embodiment, the system 100 may include one or more levels of connectivity. For example, cellular networks may include touch distance levels, including ranges even shorter than typical short range connections, in addition to the short-range connections. For instance, the system 100 may determine that the devices must be in touch to be part of the local network. In one scenario, the system 100 may resort to the short range wireless network between devices only when the touch distance is broken, such as if an emergency situation interrupts the touch distance. In other words, the two-level emergency connectivity paired with connectivity distance could influence the e-calling initiation.

To determine connectivity between the mobile devices and the car, the system 100 may include initial verification of device presence (as stated above with the detection system warnings), followed by forming an association between the at least one device and another device (a car and a mobile phone, for example). The association may include a radio frequency (RF) memory tag and a mobile device peer element. As previously discussed, the system may automatically associate with a system of the device, as in a seatbelt warning system. For instance, when no devices are detected in connectivity with the at least one device, a warning sound is emitted. Then, the system may validate a potential network between other available devices found and associated with the devices. The system may continually monitor the surrounding proximity for other devices and monitor changes in the associated devices. In one embodiment, the system may monitor the operational status information, device capability information, resource availability information, or a combination thereof.

Operational status information may include information on whether the device is in a state where it can operate to place a call. For instance, passengers' mobile devices may easily be broken in the event of a car accident. Verifying operational status information of a passengers' mobile device may inform the system 100 of whether the device still has the ability to operate to perform as part of system 100, or if the device is no longer operational. Device capability information may include the compatibility of at least one device, one or more other devices, or a combination thereof with the system 100. As previously discussed, e-calling may include transmitting a data set, voice, and/or video. Assessment of device capability information informs the system 100 of the services that the devices may offer and whether system 100 may employ the services. Resource availability information may refer to battery life and/or reception strength. In one embodiment, the system 100 may select one or more UEs 101 within system 100 to initiate a call based on the UEs 101 having superior reception and battery power relative to other connected UEs 101.

In one embodiment, the one or more docks may provide functions in addition to detection. For example, one or more docks may provide wireless charging. In another example, one or more docks may activate capabilities for short range communications. In one such scenario, placing a mobile device on a dock may activate Bluetooth of the device with a car and potential other mobile devices in the car. The dock could also prompt the mobile devices to contact the other devices to activate Bluetooth connection between the devices, and between the devices and the car.

In another embodiment, the system may include sensors that detect a condition to alert the system to request an initiation of a call. For example, the sensors may coincide with an emergency condition to request a device to place an emergency call. In one such case, sensors may include sensors to detect vehicle emergencies, including vehicle airbag deployment, rapid acceleration or deceleration, sudden engine stop, or some combination thereof. In another case, sensors may be associated with physiological aberrations, including sudden change in heart rate, heart failure, etc. In one embodiment, the sensors would detect an emergency condition, alert all the devices validated as part of the network, then select the device with the best reception and battery power to initiate an emergency call. In such a case, the potential network may be formed previously, as given in the paragraph above, or initiated upon signals from the sensors. The latter case where the network is not initiated until detection of an emergency from the sensors, may save battery or other resources of the devices.

In one embodiment, the system 100 may then select one of the connected devices to place the emergency call. In one embodiment, one of the connected devices may be selected should a fixed or proprietary system be incapacitated to place the call. For instance, the system 100 may select a mobile phone inside a car to place an e-call where the car's dedicated or proprietary e-calling system is unavailable. In another embodiment, the system 100 selects one of the connected devices, including the fixed or proprietary system, depending on which has the best resources to make the e-call. For example, even if a car's OnStar system is available, the system 100 may select a mobile phone with superior reception relative to the OnStar system to place the call.

Selection of the one or more devices may include using RF memory tag servers and a memory manager. Radio frequency (RF) memory tag solutions may include high capacity non-volatile memory with fast RF link(s). RF memory tag solutions may allow wireless memory devices to use available (Wireless Power Transfer (WPT) and Wireless Data Transfer (WDT)) radios within the radius of a few centimeters to provide the system 100 with information to enhance the call. For example, the radios may provide the capability to receive and retrieve information regarding connectivity and memory access availability with respect to connected devices. For instance, RF memory tags associated with one or more mobile devices may identify the mobile devices to the system 100 so that the system 100 may assess the various connected mobile devices and, in turn, select a main mobile device with the best signal reception and enough battery power to place a call.

In one embodiment, the devices could collectively form a common virtual multiple antenna system to enhance the connection between the devices and an emergency response center, especially in terms of capacity and range. For example, the connected devices, including a possible car hardwire phone, could collectively form a virtual MIMO antenna system. The collective MIMO antenna would have an improved signal-to-noise ratio relative to the individual antennas of any of the devices alone. Such antennas may provide calls with better capacity and range. In one instance, the device with the best battery status may act as a coordinator within all the connected devices. This device may coordinate the other devices to form the antenna.

For instance, a car may be involved in an accident. Given system 100, multiple mobile devices (including the car) may contribute to establish a MIMO antenna. In one embodiment, MIMO antennas enhance capabilities of independent individual terminals by leveraging capabilities of multiple available radio terminals. For instance, the system may combine the available independent radio terminals of cars and mobile devices associated with passengers in cars to improve the communication capabilities of the individual terminals. For example, the multiple antenna system may include a MIMO MAC, a case where the multiple mobile devices may connect to a single receiver wireless network. Advanced receive processing to establish the MIMO antenna may include joint interference cancellation and Space-Division Multiple Access-based uplink user scheduling. In one embodiment, the system 100 may recognize channel state information of one or more emergency response centers in proximity of the car such that the system 100 knows the emergency response center channel state information needed to perform advanced receive processing. Such channel state information may be preconfigured and/or actively provided by emergency response centers. Alternately, channel state information of the at least one device and the one or more other devices identified by the detection system may provide the channel state information necessary for system 100 to perform the advanced receive processing to build a MIMO antenna.

In yet another embodiment, the devices participating in creating the virtual antenna and possibly placing the call may not be connected ahead of time. For example, devices not connected to a common network in a car by Bluetooth may still activate their Bluetooth connection and contact nearby devices when they receive a request to initiate at least one call or a signal from one or more associated sensors. In doing so, the previously unconnected devices may join the local network as potential call providers. For instance, mobile phones inside cars driving by a vehicle collision or cars within a given radius of a vehicle emergency may be activated to participate in the common network. Such a scenario could extend to mobile phones at standing establishments, such as coffee shops, that are within a pre-configured radius of the emergency.

In one further embodiment, the system 100 may augment the e-call with other relevant information. For example, the system 100 provides a voice connection, a video connection, or a combination thereof. In another instance, the call may include transmission of data associated with the devices, the other devices, or a combination thereof. For example, the data may include vehicle information, user health information, location information, or a combination thereof. In other words, the system may transmit the make and model of the vehicle involved in an emergency, the identity of a user associated with the vehicle or mobile device, medical history of the user, location information, or a combination thereof. In one scenario, the system 100 may place the e-call over a multiple antenna system to improve the connectivity or transmit the call over a longer distance where a single device would lack the capacity.

As shown in FIG. 1, the system 100 comprises at least one user equipment (UE) 101a having connectivity to a call manager 103a, sensor module 107, one or more other user equipment devices 101 (or UE 101b-101n and/or UE 101k) connected to respective call managers 103 (or 103b-103n and/or 103k) and a connectivity processor 109 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, a car may serve as the UE 101a. In other words, an automatic emergency call mechanism supported by a car may serve as UE 101a. Call manager 103a may be in connectivity with the sensor module 107 such that sensor module 107 may relay a request to call manager 103a to initiate at least one call from UE 101a when sensors associated with the sensor module 107 detect a scenario associated with call initiation. For example, sensors associated with the sensor module 107 may detect an emergency condition and trigger the call manager 103a to make an emergency call. In another embodiment, the call manager 103a may initiate connectivity with one or more other UEs 101b-101n. For example, the one or more other UEs 101b-101n may include mobile devices associated with passengers in the car denoted as UE 101a. After initiating connectivity, the call managers 103a-103n may determine to select at least one main device out of the connected at least one UE 101a and one or more other UEs 101b-101n that may ultimately place the emergency call initiated by sensor module 107.

UE 101k provides the scenario where one or more devices not in the vehicle passenger embodiment connect to UE 101 to aid in completing a call. For instance, call manager 103k may connect the call managers 103a-n and UEs 101a-n when UEs 101a-n and UE 101k are within a given proximity threshold of one another. In such a situation, UE 101k may not be connected to a common network in UE 101 previously, but call manager 103k may initiate connection between UEs 101k and 101a the devices in in sufficiently close proximity. For example, mobile phones not readily associated with passengers in a vehicle may join the local network. For instance in joining the network, the call manager 103a may configure the mobile phones to act as potential call providers. In other words, call manager 103a may configure mobile phones in the network to receive a request to initiate a call when relevant signals are received from the sensor module 107. The call manager 103a may also monitor various resource capabilities of the connected devices and select one device with which a potential call would be made. Selection may be contingent on various criteria, including battery power and signal strength.

In addition, the call managers 103a-103n and 103k may enhance e-calling by creating a multiple antenna system with the available nodes provided by each of the mobile devices. For example, the call managers 103a-103n and 103k may create at least one subset of connected mobile devices to establish a MIMO over which the e-call could be placed. For instance, the call managers 103a-103n and 103k may build the antenna, at least in part, by activating short-range wireless connections and/or touch distance wireless connections associated with the UEs 101a-n and 101k. Using such an antenna system may ensure more reliable e-calling service, especially in rural areas where connectivity may be low. Call managers 103a-n and 103k may also govern augmenting e-calls, for instance with establish voice connections, video transmittal, and/or a minimum data set. In one embodiment, call managers 103a-n and 103k may access information associated with UEs 101a-n to aid emergency response centers in providing relief.

Alternately or in addition, the connectivity processor 109 may facilitate the call managers 103a-n and 103k in determining the at least one main device and/or establishing a multiple antenna system. For example, the system 100 may perform selection of the main device and building of an antenna system locally with the call managers 103a-n and 103k, and/or perform these two steps remotely with the connectivity processor 109. In one instance, use of the connectivity processor 109 may provide an alternative to the local call managers 103a-n and 103k to conserve resources of the UEs 101a-n.

By way of example, the UEs 101a-n (and 101k), emergency modules 103a-n (and 103k), and connectivity processor 109 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

FIG. 2A is a diagram of the components of the call manager 103, according to one embodiment. By way of example, the call manager 103 may include one or more components for providing the capability to select a main UE 101 to initiate a call and initiate a call using a multiple antenna system. It is contemplated that the functions of these components may be combined in one or more components or performed by other components of equivalent functionality. In this embodiment, the call manager 103 includes a detection module 203, grouping module 205, antenna module 207, and selection module 209. The control logic 201 executes at least one algorithm for executing functions at the call manager 103.

In one embodiment, the call manager 103 may determine the devices connected, select one or more devices as a main device to place a call, establish a multiple antenna system, and/or place a call using the established multiple antenna system. In one embodiment, the control logic 201 may work with the detection module 203 to detect the presence of one or more devices that may serve as call providers. In one such embodiment, the detection module 203 may cause one or more detected devices to initiate connectivity to the UE 101, with each other, or a combination thereof. For example, the detection module 203 may include one or more docks that show the presence of one or more UEs 101. In one instance, the detection module 203 may interact with another module on the one or more UEs 101 to emit a signal when the presence of one or more UEs 101 is not detected. For one scenario, the detection module 203 of a car, for example, may be linked to a seatbelt system such that the seatbelt warning beep sounds until the presence of one or more UEs 101 is detected. In one instance, detection modules 203 may automatically initiate one or more other UEs 101 to activate connectivity with the at least one device (via NFC, Bluetooth, local area network, etc.). In another instance, the detection module 203 may initiate connectivity as a response to communication with the sensor module 107. In one scenario, the detection module 203 may prompt one or more other devices to join a local network in response to sensor module 107 input that an emergency condition was detected.

In another embodiment, the control logic 201 and detection module 203 may determine one or more devices within a proximity threshold of at least one device. In one scenario, the proximity threshold may be pre-configured. In another scenario, the proximity threshold may depend on the connectivity or range available to the one or more devices already detected as part of a network. The detection module 203 may be associated with one or more docks, where one or more devices are detected as within the proximity threshold to build a virtual antenna when it is detected by one or more docks. In one embodiment, the control logic 201 may also cause the detection module 203 to keep track of the one or more devices entering or exiting a certain proximity threshold. For instance, as a car nears a restaurant, the detection module 203 may detect one or more UEs 101 in the restaurant as part of the network, but as a car pulls away from a restaurant, the one or more UEs 101 may exit the network. In one embodiment, the control logic 201 and detection module 203 may cause activation of short-range wireless connections and/or touch distance connections to cause connectivity between the at least one device and one or more devices.

In one embodiment, the control logic 201 may work with the grouping module 205 to recognize operational status information, device capability information, resource availability information, or a combination thereof associated with the UE 101. For example, the grouping module 205 may identify and monitor information associated with each mobile device and evaluate the connected UEs 101 by taking into account information including battery power and connectivity strength. In one example, RF memory tags associated with UEs 101 may provide such information. In evaluating data regarding device capabilities, the control logic 201 and grouping module 205 may select at least a subset of the at least one device, the one or more other devices, or a combination thereof that are in connectivity with one another as indicated by the detection module 203.

In one embodiment, the control logic 201 may assess various capabilities of one or more devices, including capabilities relating to connectivity and battery life. In one embodiment, the grouping module 205 may monitor device operational status information, device capability information, resource availability information, or a combination thereof, for the devices identified by the detection module 203 as part of a network. The control logic 201 and grouping module 205 may then provide the antenna platform 207 and selection platform 209 with data necessary to build an antenna and select one or more UEs 101 to initiate a call.

Following grouping of at least one device, one or more other devices, or a combination thereof into at least one subset, the control logic 201 may work with the antenna module 207 to establish a multiple antenna system, including a MIMO antenna system. In one embodiment, the control logic 201 and antenna module 207 may establish different MIMO antenna systems, based on various subsets created through the grouping module 205. In one embodiment, the various subsets are based on the at least one mobile device and one or more other devices in which short-range wireless connections have been activated. In one embodiment, the control logic 201 may initiate the call using the multiple antenna system such that the multiple antenna system is used to transmit a minimum data set, provide a voice connection, permit video calling, or a combination thereof.

In one embodiment, the control logic 201 may interact with the selection module 209 to select at least one main device to initiate a call. The selection module 209 may interact with the detection module 203 and grouping module 205 to determine the best device, out of the connected devices, to initiate the call. For example, the call manager 103 may evaluate the battery power and connectivity strength of the various connected UEs 101 and select, using RF memory tags, one mobile device out of the connected UEs 101 to place the call. The detection module 203 may inform the selection module 209 when one or more devices come in or out of connectivity, while the grouping module 205 provides the capabilities of each of the devices. The selection module 209 may then rank the available devices by capability to determine one or more main devices to initiate the call. In one instance, the control logic 201 may cause the selection module 209 to select a device other than the originally picked main device, should the main device fail. For example, the selection module 209 may determine that the selected main device is unable to initiate at least one call for a predetermined period of time and thus cause selection of at least one other main device to initiate the call. In one scenario, the call manager 103 may prompt the next best ranked UE 101 to initiate the call.

Figure 2B:
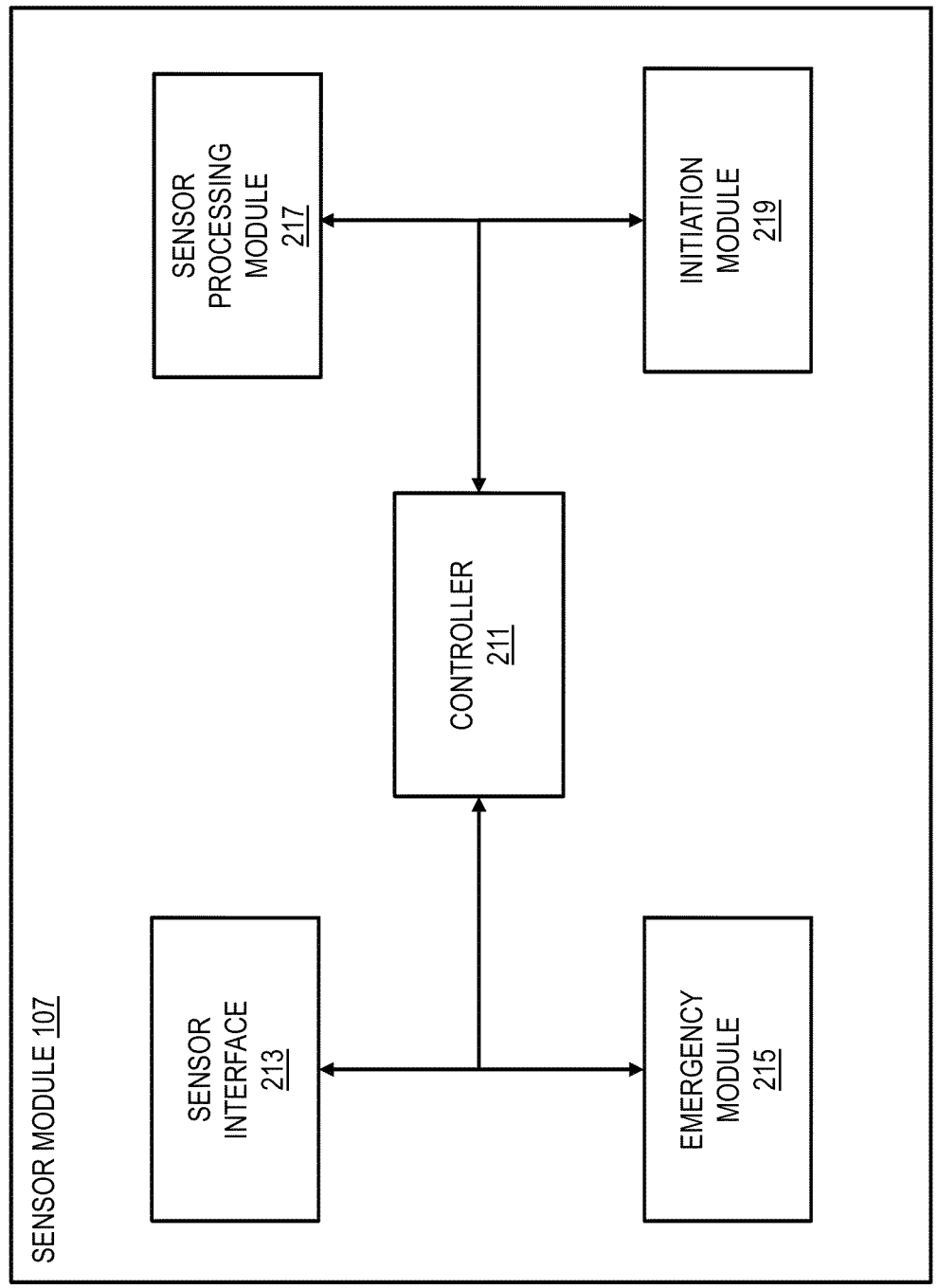
FIG. 2B is a diagram of the components of the sensor module, according to one embodiment.

FIG. 2B is a diagram of the components of the sensor module 107, according to one embodiment. By way of example, the sensor module 107 may include one or more components for providing the capability to initiate a call. It is contemplated that the functions of these components may be combined in one or more components or performed by other components of equivalent functionality. In this embodiment, the sensor module 107 includes a sensor interface 213, emergency module 215, sensor processing module 217, and initiation module 219. The controller 211 executes at least one algorithm for executing functions at the sensor module 107.

In one embodiment, the sensor interface 213 may receive data from sensors associated with the UE 101a. For instance, the sensors may be associated with certain emergency signals, including rapid acceleration, rapid deceleration, vehicle engine stop, vehicle airbag deployment, user physiological changes, or a combination thereof. In one embodiment, UE 101a may be a car with sensors gathering data regarding its airbags. The controller 211 may cause the sensor interface 213 to monitor several sensors tracking one multiple aspects of the UEs 101. In one embodiment, the emergency module 215 may define parameters associated with call initiation, where the sensors gather data regarding the parameters. For instance, emergency module 215 may define airbag deployment as cause for leveraging multiple devices in initiating a call. The emergency module 215 may set normal ranges of activity.

The sensor processing module 217 may process data from the sensor interface 213 and ranges from the emergency module 215 such that the sensor processing module 217 may detect cause for call initiation when sensor data from the sensor interface 213 is out of range from parameters set by the emergency module 215. In addition, the sensor processing module 217 may detect when input from the sensor interface 213 may indicate that the parameters set by the emergency module 215 require modification. For example, the sensor processing module 217 may detect that sensor data regarding acceleration from the sensor interface 213 routinely reflects rapid, sudden acceleration. Under typical conditions, the acceleration may border on parameters set in the emergency module 215. However, the particular driver or vehicle may be prone to quicker acceleration as a habit. As such, the sensor processing module 217 may detect the practice and adjust parameters in the emergency module 215 accordingly so that calls are not initiated gratuitously. Sensor parameters associated with emergencies are only an exemplary trigger for call initiation. The sensor module 107 may be configured to respond to any range of sensory information or circumstance that may warrant initiating a call.

Upon detecting an aberration in the sensor data from ranges given by the emergency module 215, the sensor processing module 217 may trigger the controller 211 to work with the initiation module 219 to send a signal to call managers 103 and/or connectivity processors 109 initiate at least one call from at least one UE 101.

In one embodiment, the initiation module 219 may initiate the call at the control manager 203 of the selected main UE 101 upon receipt of a request to initiate a call. For instance, the initiation module 219 may receive a request from the controller 211 to initiate at least one call. For example, the initiation module 219 may automatically dial an emergency number. In a further embodiment, the initiation module 219 may interact with the call manager 103 to place the call using a virtual antenna established by the call manager 103. In yet another embodiment, the initiation module 219 may determine data associated with the UEs 101a-n and UE 101k and cause, at least in part the data, including data related to vehicle information, user health information, location information, or a combination thereof. For instance, the initiation module 219 may transmit the data over the multiple antenna system. In one scenario, the data transmitted may include a minimum set of data associated with at least one device or one or more other devices associated with the at least one device.

Figure 3:
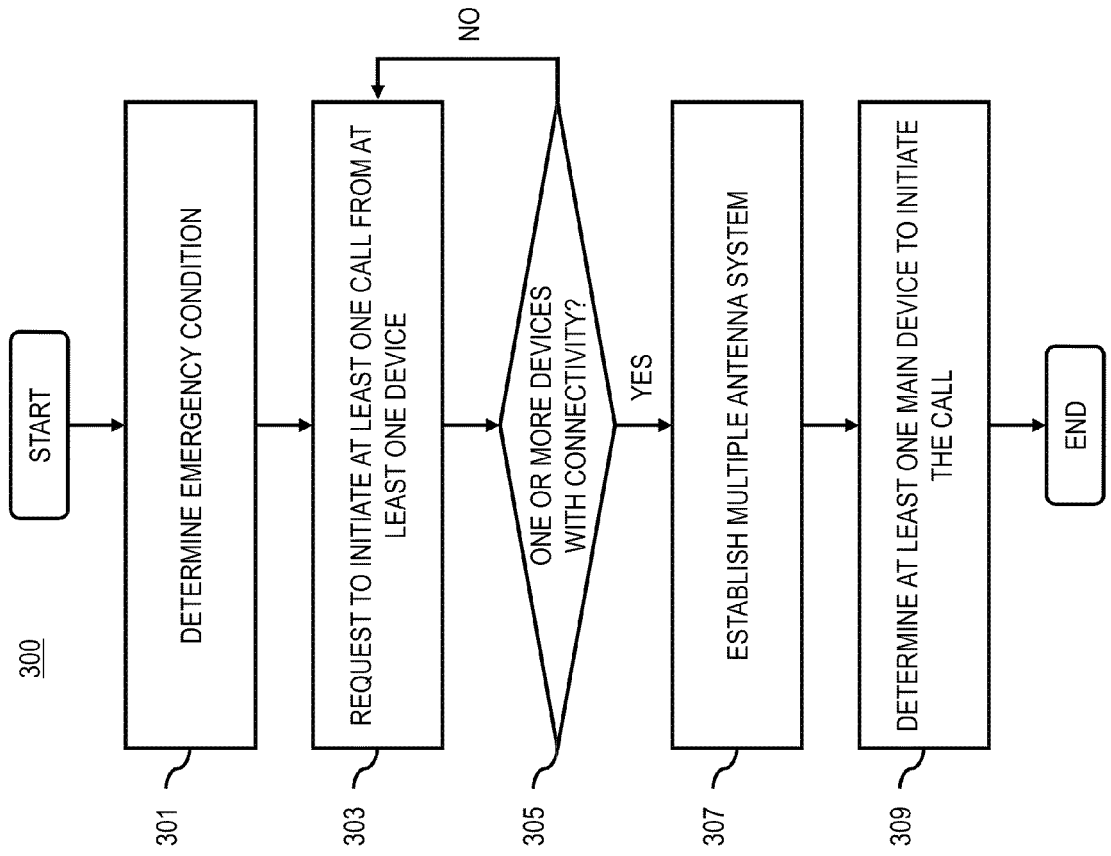
FIG. 3 is a flowchart of a process for leveraging mobile devices to enhance and make emergency calling more efficient and available to end users, according to one embodiment.
Figure 11:
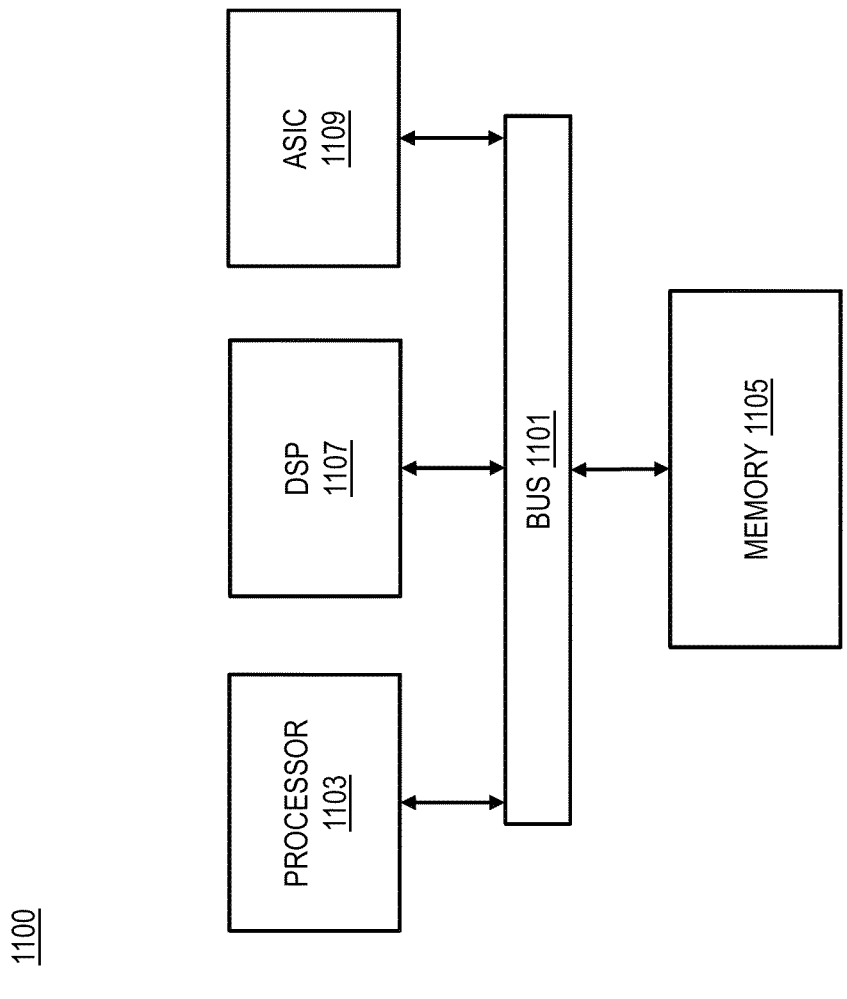
FIG. 11 is a diagram of a chip set that can be used to implement an embodiment of the invention.

FIG. 3 is a flowchart of a process for leveraging mobile devices to enhance and make e-calling more efficient and available to end users, according to one embodiment. In one embodiment, the control logic 201 of the call manager 103 performs the process 300 and is implemented in, for instance, a chip set including a processor and a memory as shown in FIG. 11. As such, the control logic 201 can provide means for accomplishing various parts of the process 300 as well as means for accomplishing other processes in conjunction with other components of the call manager 103.

In step 301, the control logic 201 may cause, at least in part, a generation of the request to initiate the at least one call based, at least in part, on a determination of at least one emergency condition, wherein the at least one call is at least one emergency call. Controller 211 may determine the emergency condition based on sensors associated with emergency conditions. In one embodiment, the emergency condition may be associated with vehicles such that the sensors are associated with vehicle crash or failure, including rapid acceleration, deceleration, engine stop, or some combination thereof. In another embodiment, the emergency condition may be associated with human health issues. In such a case, the sensors may detect sudden physiological changes, such as heart failure. With the detection of the emergency condition, the controller 111 may determine a request to initiate at least one call from at least one device, including at the UEs 101. The controller 111 may determine a request to initiate at least one call from at least one device (step 303).

In step 305, the control logic 201 may determine one or more other devices with connectivity to the at least one device. After evaluating the connectivity, the control logic 201 may cause, at least in part, an establishment of a multiple antenna system comprising at least a subset of the at least one device, the one or more other devices, or a combination thereof; and cause, at least in part, an initiation of the at least one call using the multiple antenna system (step 307). In one embodiment, the control logic 201 may establish an antenna system wherein the multiple antenna system is a MIMO antenna system. In a further embodiment, the control logic 201 may determine an association between the at least one device and the one or more other devices with connectivity to the at least one device; and cause, at least in part, a validation of a potential network between the at least one device and the one or more other devices. For example, the control logic 201 may cause, at least in part, activation of short-range wireless connections associated with the at least one device and one or more other devices and process and/or facilitate a processing of the short-range wireless connections to cause, at least in part, creation of the multiple antenna system.

After creating the multiple antenna system, the control logic 201 may determine at least one main device from among the at least one device and the one or more other devices to initiate the at least one call based, at least in part, on operational status information, device capability information, resource availability information, or a combination thereof (step 309). Once the selection is made, the initiation modules 109 at UEs 101 may initiate the calls based on commands from the controller 211 and/or connectivity processor 109. In one embodiment, the control logic 201 may determine that the at least one main device is unable to initiate the at least one call for a predetermined period of time; and cause, at least in part, a selection of at least one other main device to initiate the at least one call. In one embodiment, the control logic 201 may determine data associated with the at least one main device and cause, at least in part, the data to be transmitted over the multiple antenna system, wherein data may include vehicle information, user health information, location information, or a combination thereof. Such data may include a minimum data set associated with a vehicle and one or more mobile devices.

Figure 4:
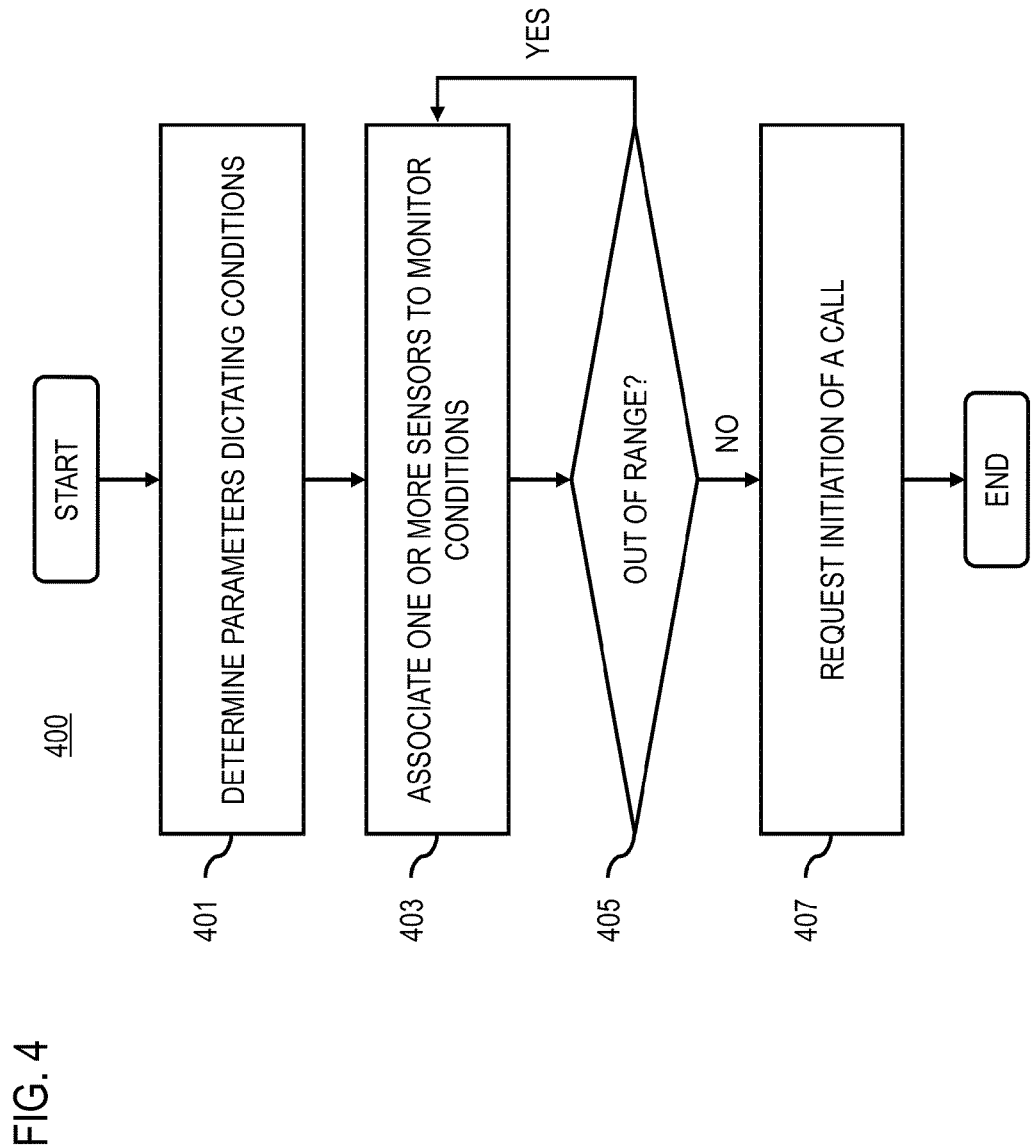
FIG. 4 is a flowchart of a process for determining a request to initiate at least one call, according to one embodiment.

FIG. 4 is a flowchart of a process for determining a request to initiate at least one call, according to one embodiment. In one embodiment, the controller of the sensor module 107 performs the process 400 and is implemented in, for instance, a chip set including a processor and a memory as shown in FIG. 11. As such, the controller 111 can provide means for accomplishing various parts of the process 400 as well as means for accomplishing other processes in conjunction with other components of the sensor module 107.

In step 401, the controller 111 may determine parameters and ranges of data that may initiate a call. In one embodiment, the parameters may include healthy or regular range of heart rate such that an aberration from the parameter may indicate a condition to place an emergency call. In another embodiment, as previously discussed, the parameters may include typical ranges for various mechanisms in a car, including speed and engine function. For step 403, the controller 111 may identify one or more sensors to monitor various conditions related to the parameters set in step 401. In one embodiment, step 403 may include associating the one or more sensors with the identified parameters. The controller 111 may simultaneously monitor multiple sensors tracking various areas and functions of the devices.

Next in step 405, the controller 111 may detect when incoming sensor data deviates from the previously set parameters. In one embodiment, such detection may include the controller 111 determining that an emergency condition is present. For step 407, the controller 111 may then request initiation of a call. In one embodiment, the controller 111 may then send a signal to call managers 103 to initiate calls at one or more UEs 101. In a further embodiment, the controller 111 may not request an initiation of a call unless a combination of sensor data is out of range. For example, sensors detecting rapid acceleration or deceleration alone may not cause step 407 or the controller 111 to initiate a call. Instead, controller 111 must observe the combination of rapid change in speed coupled with airbag deployment before a request to initiate a call is sent. Such a system 100 may be tuned to better ensure that emergency calls are not made in error.

Figure 5:
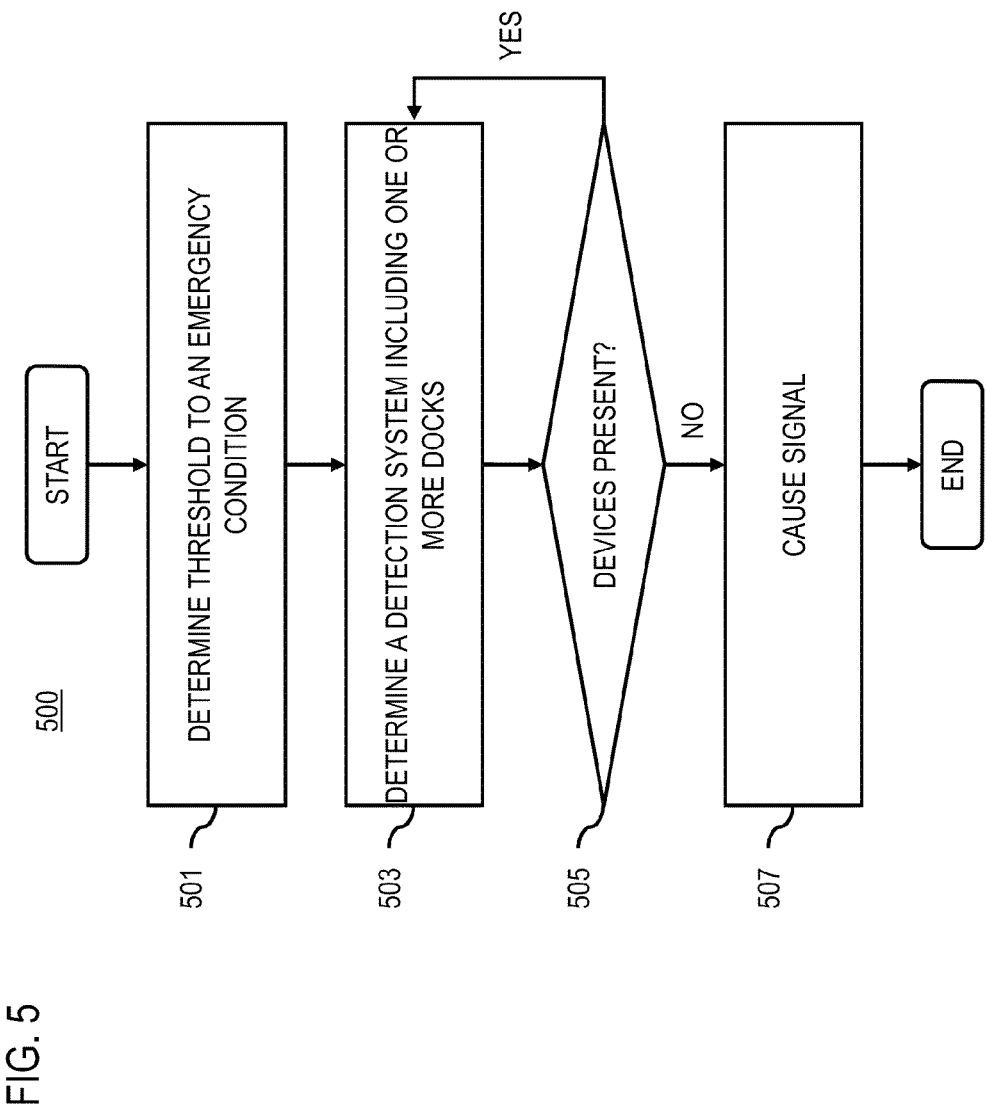
FIG. 5 is a flowchart of a process for determining the presence of the one or more other devices, according to one embodiment.

FIG. 5 is a flowchart of a process for determining the presence of the one or more other devices, according to one embodiment. In one embodiment, the control logic 201 of the call manager 103 performs the process 500 and is implemented in, for instance, a chip set including a processor and a memory as shown in FIG. 11. As such, the control logic 201 can provide means for accomplishing various parts of the process 500 as well as means for accomplishing other processes in conjunction with other components of the call manager 103.

In step 501, control logic 201 may determine a scenario wherein the at least one device, one or more devices, or a combination thereof are within a proximity threshold of an emergency condition. In one embodiment, the control logic 201 may set a threshold of the at least one device, one or more other devices, or a combination thereof that may potentially participate in placing the call, establishing the multiple antenna system, or a combination thereof. For step 403, the call managers 103 may also act as a detection system or include one or more docks for detection. As previously discussed, various radio frequency tag solutions, NFC, and/or Bluetooth may be used to initiate connectivity between the at least one device, the one or more devices, and the one or more docks. The control logic 201 of the participating devices such that the call managers 103 may act a detection system that determines the presence of the one or more other devices (step 405). In one embodiment, the call managers 103 may determine the presence of the at least one device, the one or more other devices, or a combination thereof via one or more docks; and cause, at least in part, a signal if the presence is not detected (step 407).

As previously discussed, the signal may include a beep to warn passengers that one or more other devices are not in connectivity with the at least one device. In one embodiment, the signal may be integrated with another system in the at least one device. For example where the at least one device UE 101a is a car, cars typically include a seatbelt warning where a beeping warning sound is emitted when the car detects that a passenger has not engaged the respective seatbelt. The signal associated with one or more devices may be bound to the seatbelt warning such that if the control manager 103a fails to detect the presence of one or more device in connectivity with the at least one device, the control manager 103a causes the seatbelt warning beep to sound. In doing so, passengers may be warned that the control manager 103a has not yet detected one or more suitable devices in connectivity with UE 101a. The connectivity verification previously discussed may include such a detection system and warning signal.

Figure 6:
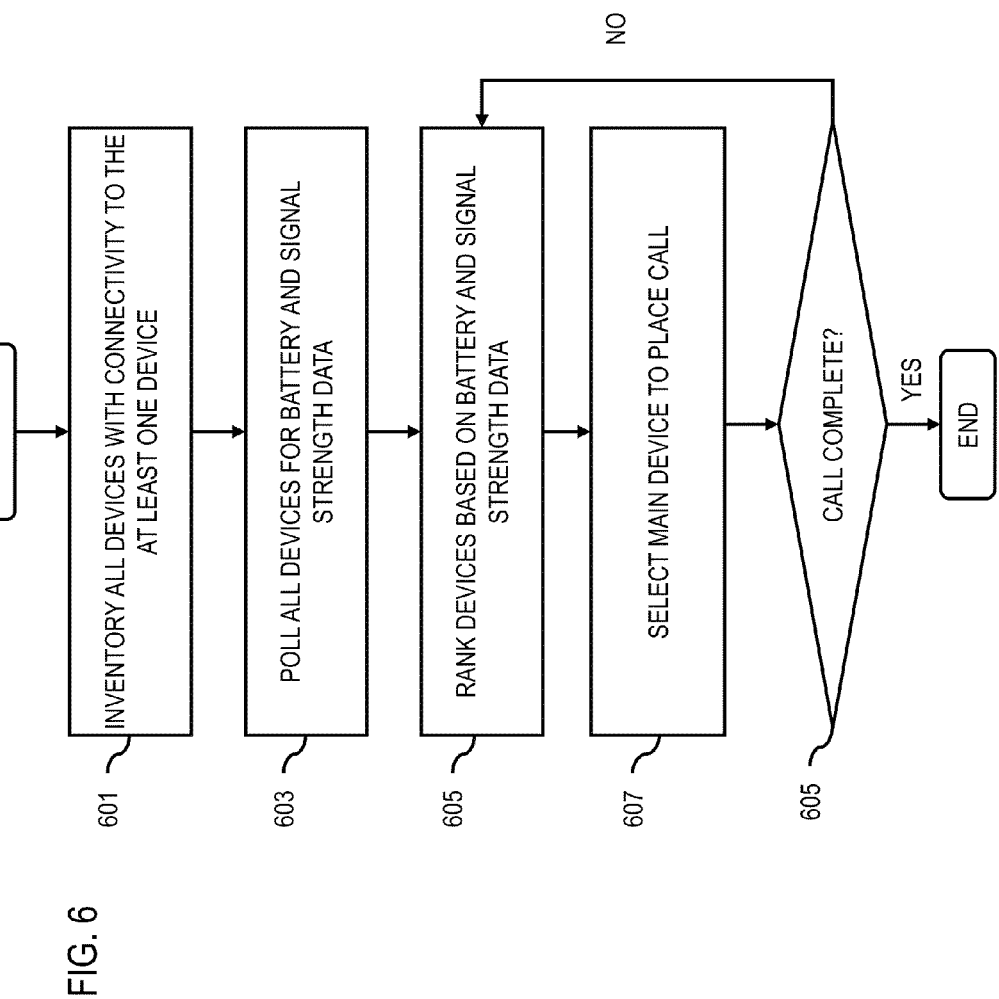
FIG. 6 is a flowchart of a process for determining at least one main device to initiate the at least one call, according to one embodiment.

FIG. 6 is a flowchart of a process for determining at least one main device to initiate the at least one call, according to one embodiment. In one embodiment, the control logic 201 of the call manager 103 performs the process 600 and is implemented in, for instance, a chip set including a processor and a memory as shown in FIG. 11. As such, the control logic 201 can provide means for accomplishing various parts of the process 600 as well as means for accomplishing other processes in conjunction with other components of the call manager 103.

In one embodiment, the call manager 103 may take an inventory all the devices with connectivity to the at least one device (step 601). As previously discussed, one or more devices may come into connectivity with the at least one device via one or more docks associated with the at least one device. In identifying all of the one or more devices in connectivity with the at least one device, the call manager 103 may receive data regarding the available resources of each device via RF memory tags, for instance (step 603). Resource information may include operational status information, device capability information, resource availability information, or a combination thereof.

As previously discussed, operational status information may include information on whether the device is actually operational, or if it may lack some functionality. For instance, the call manager 103 may infer that a UE 101 is not operational if at one point, a return signal is no longer detected between the call manager 103 and the device. In one case, mobile devices may be fragile in the case of a car crash. Previously connected mobile devices may be broken in the impact. Operational status information would relay this lack of function to the call manager 103. Device capability information may pertain to compatibility with the system 100. As previously discussed, e-calling may include providing a voice channel, or even a video channel. Device capability information would provide the call manager 103 with information on whether one or more devices may provide the service required in the initiated call. Resource availability information may include data on battery life. For example, a device may have strong connectivity and powerful capabilities, but lack the battery resources to complete the call. For step 605, the call manager 103 may monitor the resource information of the one or more connected devices and continually rank the one or more devices according to criteria based on such information.

For step 607, the call manager 103 may select the most ideal of the one or more connected devices as a main device to place an e-call. As device resource availability is subject to change, the call manager 103 may be configured to update its main device selection in accordance with shifting resource information. For example, if the originally selected main device is unable to complete the call, the call manager 103 may move to the next device on its ranking and initiate that device to initiate a call. In a further example, a first main device may first place the call successfully, but run low on batteries before emergency personnel gather enough information. Here, the call manager 103 may then move to select a next main device to continue with the call such that the call does not get disconnected even as the first main device no longer has the resources to continue with the call.

Figure 7:
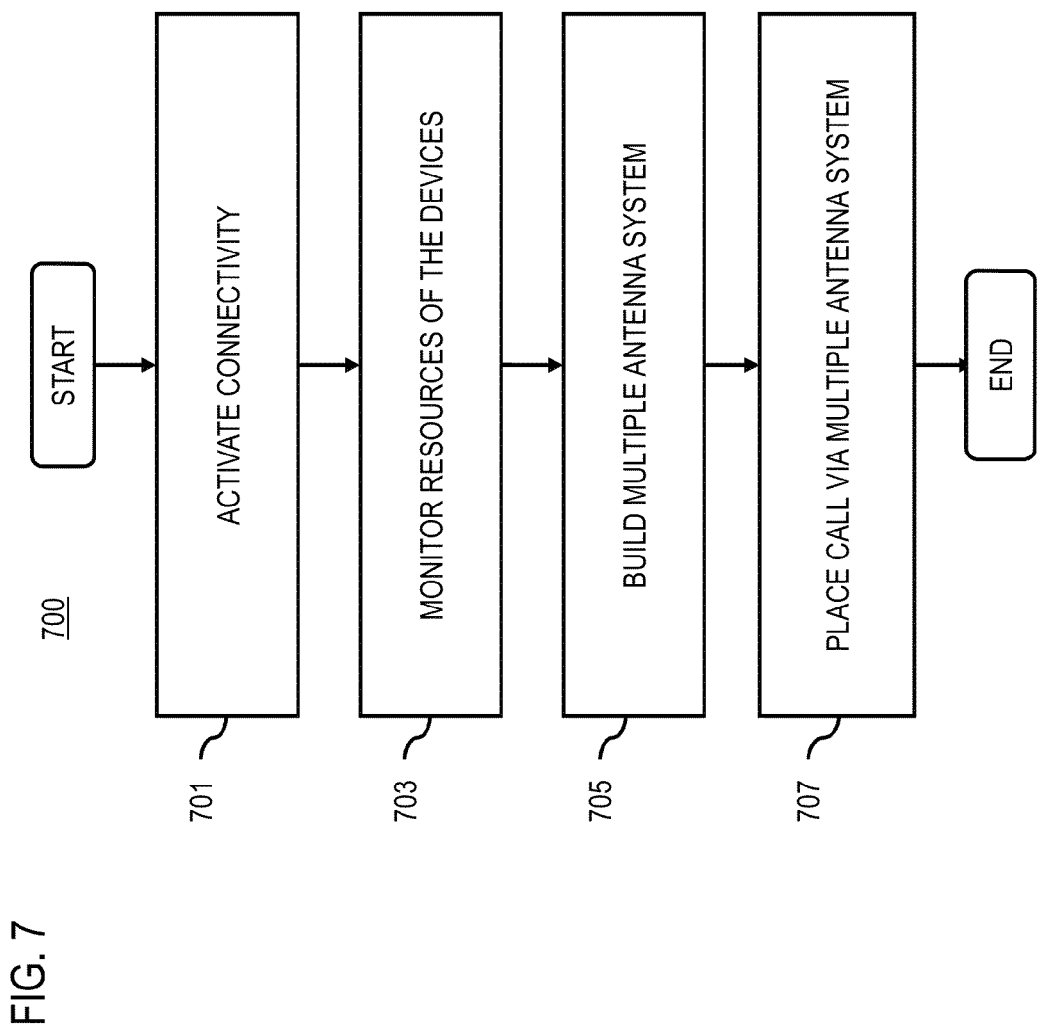
FIG. 7 is a flowchart of a process for establishing the multiple antenna system, according to one embodiment.

FIG. 7 is a flowchart of a process for establishing the multiple antenna system, according to one embodiment. In one embodiment, the control logic 201 of the call manager 103 performs the process 700 and is implemented in, for instance, a chip set including a processor and a memory as shown in FIG. 11. As such, the control logic 201 can provide means for accomplishing various parts of the process 700 as well as means for accomplishing other processes in conjunction with other components of the call manager 103.

In step 701, the control logic 201 may prompt one or more other devices to activate connectivity to one another. Previous embodiments discuss connectivity of one or more other devices to the at least one device. To establish the multiple antenna system, the control logic 201 may initiate connectivity among the one or more other devices. In one embodiment, the UEs 101 may activate their Bluetooth connections and contacting nearby devices to join the common network. Once multiple UEs 101 are connected, the control logic may monitor the resources of the devices, including the available antennas offered by each of the connected UEs 101 (step 703). Next for step 705, the control logic 201 may pool the individual antennas available from the UEs 101 to build a multiple antenna system, including a MIMO antenna. Last, the control logic 201 may cause the initiated call to be transmitted via the multiple antenna system, wherein voice, video, and/or data are transmitted via the multiple antenna system to emergency response personnel.

FIG. 8 is a ladder diagram that illustrates a sequence of processes used in leveraging multiple devices in initiating a call using a multiple antenna system, according to one embodiment. In step 801, a UE 101 may generate a request to call manager 103 for detection of one or more other devices to come into connectivity with UE 101. The call manager 103 may then send a request to the UE 101a to activate a local network (step 803). Consequently in step 805, the UE 101a may activate a local network. For example, the UE 101a may turn on a Bluetooth "discovery mode" to provide a local network. Step 707, then, may involve the call manager 103 searching the nearby user equipment for potential connectivity. As discussed above, the nearby user equipment UE 101b may be detected within a certain proximity threshold and available for connectivity. For example, the nearby user equipment may be a mobile phone of a passenger in the UE 101a (where the UE 101a may be a car). When the mobile phone passed by the UE 101a, the call manager 103 could detect the presence of the phone and prompt the phone to connect to the UE 101a (step 709).

In one embodiment, the UE 101a may prompt the UE 101b to broadcast a signal that other UE 101 within the vicinity may receive (step 711). The signal may be sent using short range communications, such as Bluetooth, WiFi Direct, etc. For step 713 then, the UE 101 receiving the signal may respond to convey they connectivity. In one embodiment, the response may also include information regarding device capabilities, including battery life and reception strength. For step 715, the call manager 103 may make computations based on the collected device capability information to select at least one main device to complete a call. The call manager 103 may then process the selection and transmit to the selected main UE 101a request to initiate at least one call from the main UE 101.

Figure 9A:
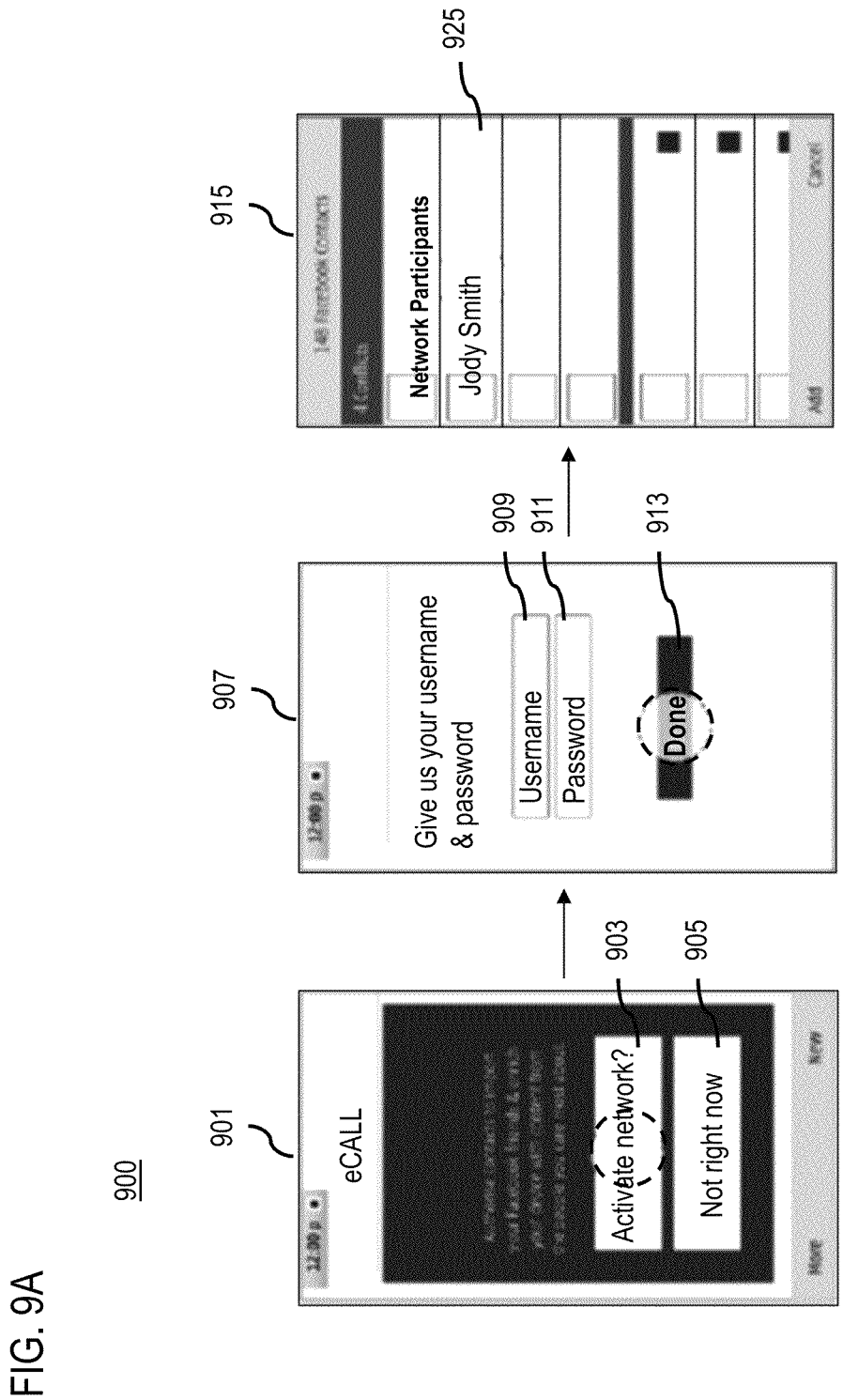
FIGS. 9A-9B are diagrams of user interfaces utilized in the processes of FIG. 3, according to various embodiments.
Figure 9B:
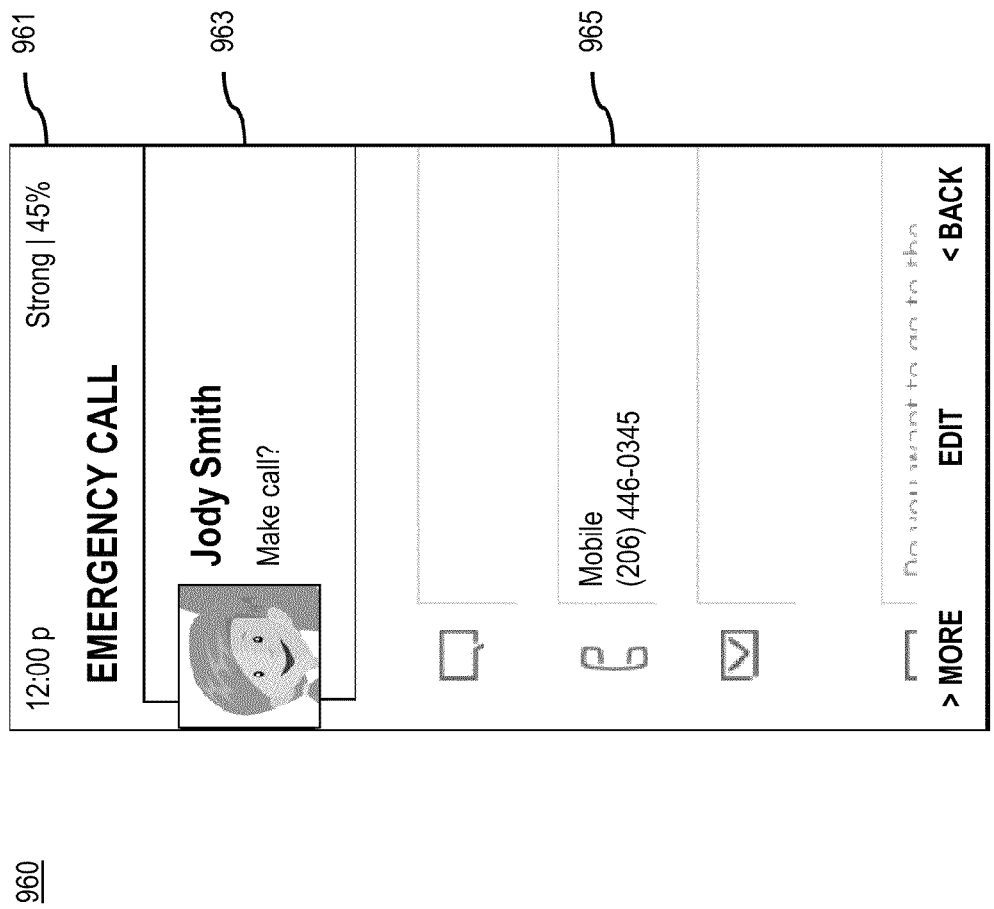

FIGS. 9A-9B are diagrams of user interfaces utilized in the processes of FIG. 3, according to various embodiments. FIG. 9A is a diagram of a user interface 900 for connecting to the at least one device. Interface 901 may include an initial start screen where one or more UEs 101 are invited to connect to the at least one device UE 101a. In one embodiment, interface 901 may show a request to join a network. The request may include the option 903 to activate the network for UEs 101 to connect to the UE 101a, or choose the option 905 to activate the network manually later. Next, interface 907 may include a login page for the UEs 101 to enter username 909 and/or password 911 information such that the at least one UE 101a may identify the engaging UE 101. In one embodiment, the login interface 907 may include a verification button 913 for a user to convey that entering of login information is complete. In logging in, the system 100 may better identify the users associated with the system 100 such that information associated with the user, available through the mobile phone, may be used to aid emergency personnel. For example, the mobile phone may include medical history or basic personal information (including age, gender, and allergies) that may be transmitted along with the e-call. The interface 915 may show the logged network participants in the form of a list 925 so that users may observe where connectivity is unavailable or did not register successfully so that they may try again or move to detect issues with the device. List 925 may also include the selection of the main device that may place an emergency call such that the order of network participants corresponds to the order in which the devices may be selected to initiate the call.

FIG. 9B is a diagram of a user interface 960 for initiating an emergency call at the device selected to place the call. In one embodiment, the interface 960 may include resource icons 961 to show the resource availability of the device, including reception strength and/or battery strength of the device. In another embodiment, the interface 960 may include a confirmation message 963 for users to manually confirm initiating a call. The message 963 may also operate as an indicator that an emergency call is being made, or that it is ongoing so the caller may easily see if the call gets disconnected. In a further embodiment, interface 960 may include information 465 that may be transferred along with the call. As previously discussed, e-calling may include the transfer of a minimum data set including GPS coordinates and other information associated with the at least one device, one or more other devices, or a combination thereof.

The processes described herein for leveraging mobile devices to enhance and make e-calling more efficient and available to end users may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
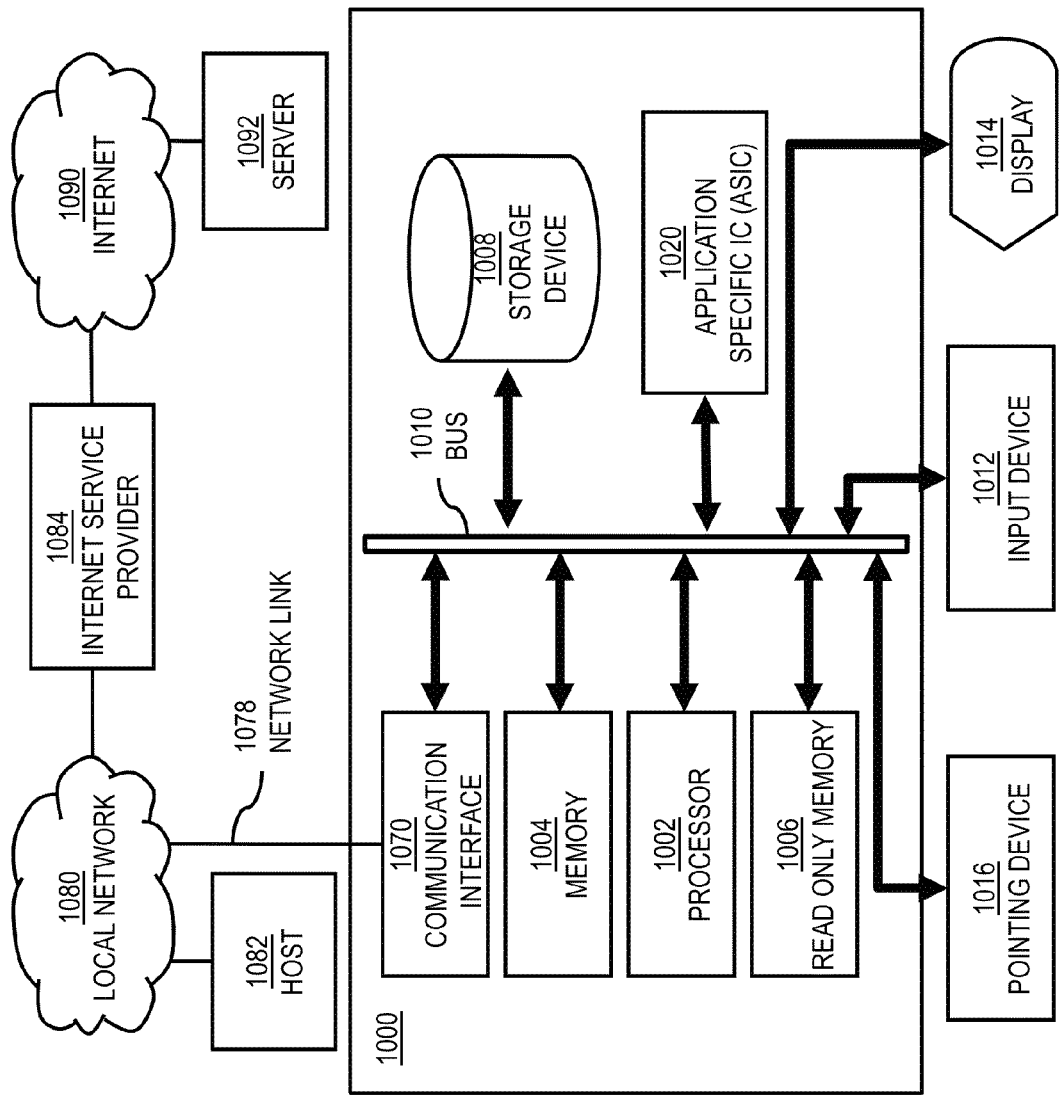
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to initiate a call using a multiple antenna system as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of leveraging multiple devices in initiating a call using a multiple antenna system.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to leveraging multiple devices in initiating a call using a multiple antenna system. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or any other dynamic storage device, stores information including processor instructions for leveraging mobile devices to enhance and make e-calling more efficient and available to end users. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for leveraging multiple devices in initiating a call using a multiple antenna system, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for leveraging mobile devices to enhance and make e-calling more efficient and available to end users to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 590.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 500 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to initiate a call using a multiple antenna system as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of leveraging multiple devices in initiating a call using a multiple antenna system.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to leverage mobile devices to enhance and make e-calling more efficient and available to end users. The memory 1105 also stores the data associated with or generated by the execution of the inventive steps.

Figure 12:
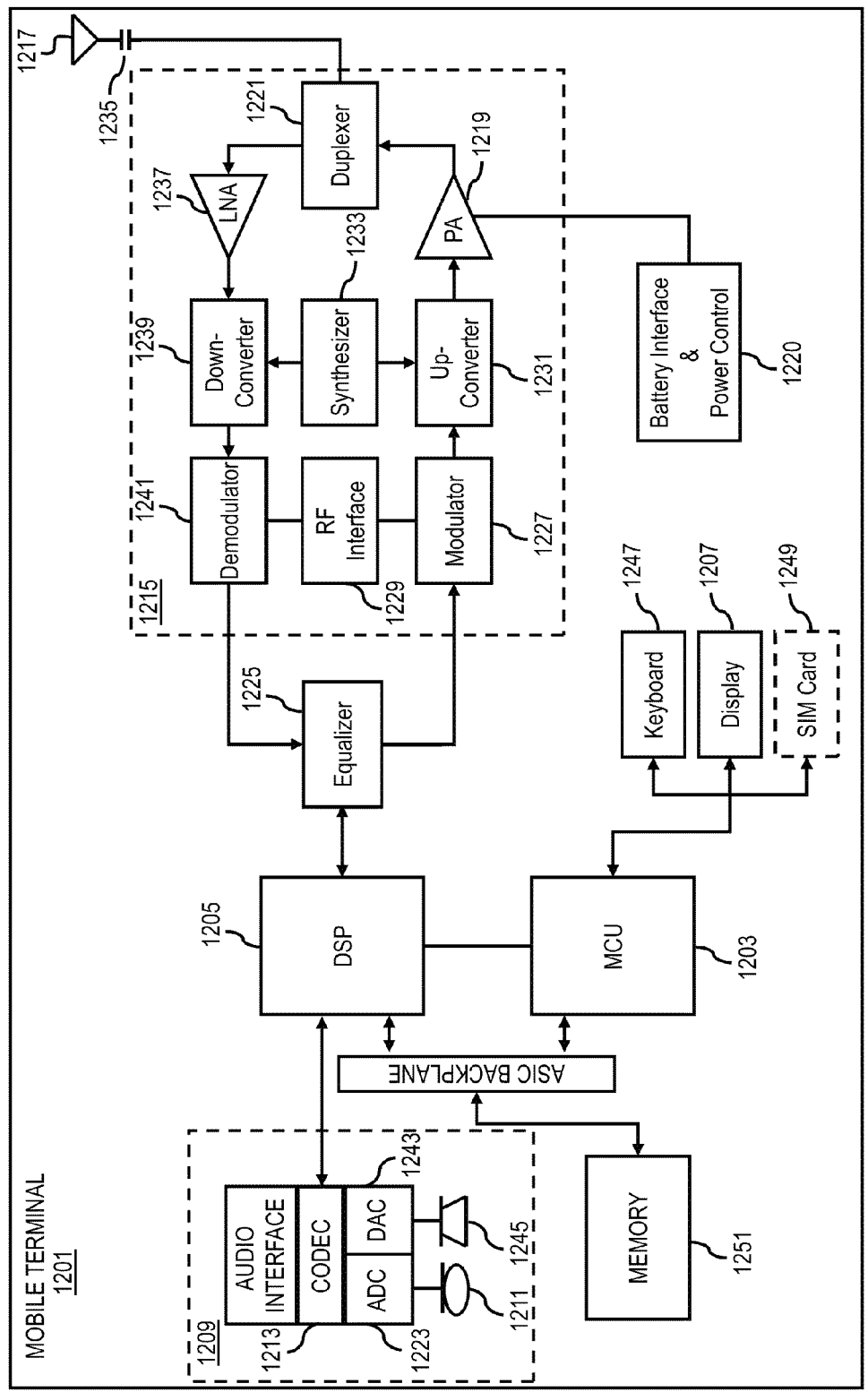
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of leveraging mobile devices to enhance and make e-calling more efficient and available to end users. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of leveraging multiple devices in initiating a call using a multiple antenna system. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 703 in combination with other user input components (e.g., the microphone 1211) comprise a user interface circuitry for managing user input. The MCU 1203 runs a user interface software to facilitate user control of at least some functions of the mobile terminal 1201 to leverage mobile devices to enhance and make e-calling more efficient and available to end users. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    a request to initiate at least one call from at least one device;
    at least one determination of one or more other devices with connectivity to the at least one device;
    at least one determination of operational status information, device capability information, resource availability information for each of the at least one device and the one or more other devices; and
    at least one determination of at least one main device from among the at least one device and the one or more other devices to initiate the at least one call based, at least in part, on the operational status information, the device capability information, the resource availability information, or a combination thereof.

2. A method of claim 1, wherein the (1) data and/or (2) information and/or (3) at least one signal are further based, at least in part, on the following: a generation of the request to initiate the at least one call based, at least in part, on a determination of at least one emergency condition,
    wherein the at least one call is at least one emergency call.

3. A method of claim 1, wherein the (1) data and/or (2) information and/or (3) at least one signal are further based, at least in part, on the following: a generation of the request to initiate the at least one call based, at least in part, on a determination of at least one emergency condition,
    an establishment of a multiple antenna system comprising at least a subset of the at least one device, the one or more other devices, or a combination thereof; and
    an initiation of the at least one call using the multiple antenna system.

4. A method of claim 3, wherein the (1) data and/or (2) information and/or (3) at least one signal are further based, at least in part, on the following:
    causing, at least in part, activation of short-range wireless connections associated with the at least one device and one or more other devices; and processing and/or facilitating a processing of the short-range wireless connections to cause, at least in part, creation of the multiple antenna system.

5. A method of claim 1, wherein the (1) data and/or (2) information and/or (3) at least one signal are further based, at least in part, on the following:
at least one determination that the at least one main device is unable to initiate the at least one call for a predetermined period of time; and
a selection of at least one other main device to initiate the at least one call.

6. A method of claim 3, wherein the at least one device, one or more other devices, or a combination thereof are within a proximity threshold of an emergency condition.

7. A method of claim 1, wherein a detection system determines the presence of the one or more other devices.

8. A method of claim 7, wherein the (1) data and/or (2) information and/or (3) at least one signal are further based, at least in part, on the following:
at least one determination that the at least one main device is unable to initiate the at least one call for a predetermined period of time; and
a selection of at least one other main device to initiate the at least one call.

9. A method of claim 1, wherein the (1) data and/or (2) information and/or (3) at least one signal are further based, at least in part, on the following:
at least one determination of an association between the at least one device and the one or more other devices with connectivity to the at least one device; and
a validation of a potential network between the at least one device and the one or more other devices.

10. A method of claim 1, wherein the (1) data and/or (2) information and/or (3) at least one signal are further based, at least in part, on the following:
at least one determination of data associated with the at least one main device; and
a transmission of the data over the multiple antenna system,
wherein data include, at least in part, vehicle information, user health information, location information, or a combination thereof.

11. An apparatus comprising:
at least one processor; and
at least one memory including computer program code for one or more programs,
the at least one memory and the computer program code configured to, with the at least one processor, cause the apparatus to perform at least the following,
determine a request to initiate at least one call from at least one device;
determine one or more other devices with connectivity to the at least one device;
determine operational status information, device capability information, resource availability information for each of the at least one device and the one or more other devices; and
determine at least one main device from among the at least one device and the one or more other devices to initiate the at least one call based, at least in part, on the operational status information, the device capability information, the resource availability information, or a combination thereof.

12. An apparatus of claim 11, wherein the apparatus is further caused to:
determine the identification of the one or more triggering devices based, at least in part, on a cause, at least in part, a generation of the request to initiate the at least one call based, at least in part, on a determination of at least one emergency condition,
wherein the at least one call is at least one emergency call.

13. An apparatus of claim 12, wherein the apparatus is further caused to:
cause, at least in part, an establishment of a multiple antenna system comprising at least a subset of the at least one device, the one or more other devices, or a combination thereof; and
causing, at least in part, an initiation of the at least one call using the multiple antenna system.

14. An apparatus of claim 13, wherein the apparatus is further caused to:
cause, at least in part, activation of short-range wireless connections associated with the at least one device and one or more other devices; and
process and/or facilitate a processing of the short-range wireless connections to cause, at least in part, creation of the multiple antenna system.

15. An apparatus of claim 11, wherein the apparatus is further caused to:
determine that the at least one main device is unable to initiate the at least one call for a predetermined period of time; and
cause, at least in part, a selection of at least one other main device to initiate the at least one call.

16. An apparatus of claim 13, wherein the at least one device, one or more other devices, or a combination thereof are within a proximity threshold of an emergency condition.

17. An apparatus of claim 11, wherein a detection system determines the presence of the one or more other devices.

18. An apparatus of claim 17, wherein the apparatus is further caused to:
determine the presence of the at least one devices, the one or more other devices, or a combination thereof via one or more docks associated with the detection system; and
cause, at least in part, a signal where the presence is not detected.

19. An apparatus of claim 11, wherein the apparatus is further caused to:
determine an association between the at least one device and the one or more other devices with connectivity to the at least one device; and
cause, at least in part, a validation of a potential network between the at least one device and the one or more other devices.

20. An apparatus of claim 11, wherein the apparatus is further caused to:
determine data associated with the at least one main device; and
cause, at least in part, a transmission of the data over the multiple antenna system,
wherein data include, at least in part, vehicle information, user health information, location information, or a combination thereof.

* * * * *